US010885912B2

(12) United States Patent
Koh et al.

(10) Patent No.: US 10,885,912 B2
(45) Date of Patent: Jan. 5, 2021

(54) METHODS AND SYSTEMS FOR PROVIDING A CORRECTED VOICE COMMAND

(71) Applicant: MOTOROLA SOLUTIONS, INC., Chicago, IL (US)

(72) Inventors: Ming Yeh Koh, Penang (MY); Hee Tat Goey, Kedah (MY); Bing Qin Lim, Penang (MY); Yan Pin Ong, Penang (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 144 days.

(21) Appl. No.: 16/189,579

(22) Filed: Nov. 13, 2018

(65) Prior Publication Data

US 2020/0152186 A1    May 14, 2020

(51) Int. Cl.
*G10L 15/22*      (2006.01)
*G06F 3/16*       (2006.01)
(Continued)

(52) U.S. Cl.
CPC .............. *G10L 15/22* (2013.01); *G06F 3/167* (2013.01); *G10L 15/08* (2013.01); *G10L 15/30* (2013.01);
(Continued)

(58) Field of Classification Search
CPC ... G10L 15/08; G10L 15/22; G10L 2015/221; G10L 2015/223; G10L 2015/225;
(Continued)

(56) References Cited

U.S. PATENT DOCUMENTS 6,078,886 A * 6/2000 Dragosh ................. G10L 15/30
                                                                704/243
6,327,566 B1 * 12/2001 Vanbuskirk ......... G10L 15/1822
                                                                704/231

(Continued)

FOREIGN PATENT DOCUMENTS

CN        104427118        3/2015
CN        107256707        10/2017
(Continued)

OTHER PUBLICATIONS

International Search Report and Written Opinion dated Feb. 3, 2020 for related International Application No. PCT/US2019/058240 (14 pages).

(Continued)

*Primary Examiner* — Eric Yen
(74) *Attorney, Agent, or Firm* — Michael Best and Friedrich, LLP

(57) ABSTRACT

Methods and systems for providing a correct voice command. One system includes a communication device that includes an electronic processor configured to receive a first voice command via a microphone and analyze the first voice command using a first type of voice recognition. The electronic processor determines that an action to be performed in accordance with the first voice command is unrecognizable based on the analysis using the first type of voice recognition. The electronic processor transmits the first voice command to a remote electronic computing device accompanying a request requesting that the first voice command be analyzed using a second type of voice recognition different from the first type of voice recognition. The electronic processor receives, from the remote electronic computing device, a second voice command corresponding to the action (Continued)

and different from the first voice command, and outputs, with a speaker, the second voice command.

19 Claims, 4 Drawing Sheets

(51) Int. Cl.
  *G10L 15/08* (2006.01)
  *G10L 15/30* (2013.01)
(52) U.S. Cl.
  CPC .. *G10L 2015/088* (2013.01); *G10L 2015/221* (2013.01); *G10L 2015/223* (2013.01); *G10L 2015/225* (2013.01)
(58) Field of Classification Search
  CPC ... G10L 15/28; G10L 15/30; G10L 2015/088; G06F 3/167
  See application file for complete search history.

(56) References Cited

U.S. PATENT DOCUMENTS

| | | | | |
|---|---|---|---|---|
| 6,526,381 | B1* | 2/2003 | Wilson | G08C 17/02 379/88.01 |
| 8,849,675 | B1* | 9/2014 | Foerster | G10L 15/22 704/275 |
| 9,443,527 | B1* | 9/2016 | Watanabe | G10L 15/22 |
| 9,704,503 | B2 | 7/2017 | Mei et al. | |
| 9,818,425 | B1* | 11/2017 | Ayrapetian | G10L 21/0224 |
| 9,911,417 | B2* | 3/2018 | Lu | G10L 15/22 |
| 9,972,318 | B1 | 5/2018 | Kelly et al. | |
| 10,388,277 | B1* | 8/2019 | Ghosh | G10L 15/1822 |
| 10,448,115 | B1* | 10/2019 | Jamal | H04N 21/4828 |
| 10,490,192 | B2* | 11/2019 | Ogawa | G10L 15/30 |
| 2004/0193420 | A1* | 9/2004 | Kennewick | G06F 16/3329 704/257 |
| 2005/0065796 | A1* | 3/2005 | Wyss | G10L 15/30 704/270 |
| 2006/0195323 | A1* | 8/2006 | Monne | G10L 15/30 704/270.1 |
| 2007/0005368 | A1* | 1/2007 | Chutorash | B60R 16/0373 704/275 |
| 2007/0129949 | A1* | 6/2007 | Alberth, Jr. | G10L 15/063 704/270.1 |
| 2007/0276651 | A1* | 11/2007 | Bliss | G10L 15/30 704/9 |
| 2008/0059188 | A1* | 3/2008 | Konopka | G10L 15/22 704/257 |
| 2009/0086934 | A1* | 4/2009 | Thomas | G10L 15/07 379/88.01 |
| 2009/0089057 | A1* | 4/2009 | Batot | G09B 19/06 704/251 |
| 2009/0112605 | A1* | 4/2009 | Gupta | G06F 3/167 704/275 |
| 2010/0209003 | A1* | 8/2010 | Toebes | G10L 15/26 382/209 |
| 2011/0166859 | A1* | 7/2011 | Suzuki | G10L 15/005 704/246 |
| 2012/0310645 | A1* | 12/2012 | Gruenstein | G10L 15/30 704/235 |
| 2013/0013298 | A1* | 1/2013 | Reding | G10L 15/00 704/201 |
| 2013/0238326 | A1* | 9/2013 | Kim | G10L 15/22 704/231 |
| 2014/0092007 | A1* | 4/2014 | Kim | G10L 15/30 345/156 |
| 2014/0129223 | A1* | 5/2014 | Bak | G10L 15/30 704/246 |
| 2014/0136183 | A1* | 5/2014 | Hebert | G06F 40/279 704/9 |
| 2015/0025890 | A1 | 1/2015 | Jagatheesan et al. | |
| 2015/0254057 | A1* | 9/2015 | Klein | H04N 21/42222 704/275 |
| 2015/0371628 | A1* | 12/2015 | Kreifeldt | G10L 15/02 704/254 |
| 2015/0379987 | A1* | 12/2015 | Panainte | G10L 15/32 704/246 |
| 2016/0240194 | A1* | 8/2016 | Lee | G06F 1/3293 |
| 2016/0252972 | A1* | 9/2016 | Kim | G10L 15/183 704/9 |
| 2016/0253989 | A1* | 9/2016 | Kuo | G10L 15/183 704/257 |
| 2016/0358603 | A1* | 12/2016 | Azam | G10L 15/1815 |
| 2017/0053650 | A1* | 2/2017 | Ogawa | G10L 15/063 |
| 2017/0133011 | A1* | 5/2017 | Chen | G10L 15/30 |
| 2017/0287477 | A1* | 10/2017 | Lu | H04W 4/70 |
| 2017/0345420 | A1 | 11/2017 | Barnett, Jr. | |
| 2018/0033429 | A1* | 2/2018 | Makke | G10L 15/02 |
| 2018/0096686 | A1* | 4/2018 | Borsutsky | H04L 51/02 |
| 2018/0240460 | A1* | 8/2018 | Matsumoto | G10L 15/22 |
| 2018/0308348 | A1* | 10/2018 | Deng | G10L 15/22 |
| 2018/0308470 | A1* | 10/2018 | Park | G10L 15/30 |
| 2018/0315427 | A1* | 11/2018 | Kwon | G06F 3/167 |
| 2019/0019516 | A1* | 1/2019 | Van Hoecke | B60R 16/0373 |
| 2019/0020493 | A1* | 1/2019 | Arling | H04L 12/282 |
| 2019/0096067 | A1* | 3/2019 | Jin | G06K 9/00791 |

FOREIGN PATENT DOCUMENTS

| | | |
|---|---|---|
| WO | 2013049237 | 4/2013 |
| WO | 2015/041892 A1 | 3/2015 |

OTHER PUBLICATIONS

Wikipedia, "If This Then That (IFTTT)," website (initial release Sep. 7, 2011) 4 pages, https://en.wikipedia.org/wiki/IFTTT.
Wikipedia, "Google Assistant," website (initial release May 18, 2016) 10 pages, https://en.wikipedia.org/wiki/Google_Assistant.

* cited by examiner

METHODS AND SYSTEMS FOR PROVIDING A CORRECTED VOICE COMMAND

BACKGROUND OF THE INVENTION

Many communication devices (such as smart phones, portable radios, laptop computers, and the like) and other physical devices (such as lights, televisions, stereos, computers, vehicles, and the like) are equipped with components that allow the devices to communicate with other devices and receive voice commands from a user. In some situations, such physical devices may be referred to as the Internet of things (IoT).

Many such communication devices further comprise, or provide access to, electronic digital assistants (or sometimes referenced as "virtual partners") that may provide the user thereof with valuable information in an automated (for example, without further user input) or semi-automated (for example, with some further user input) fashion. The valuable information provided to the user may be based on explicit requests for such information posed by the user via an input (for example, such as a parsed natural language input or an electronic touch interface manipulation associated with an explicit request) in which the electronic digital assistant may reactively provide such requested valuable information.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
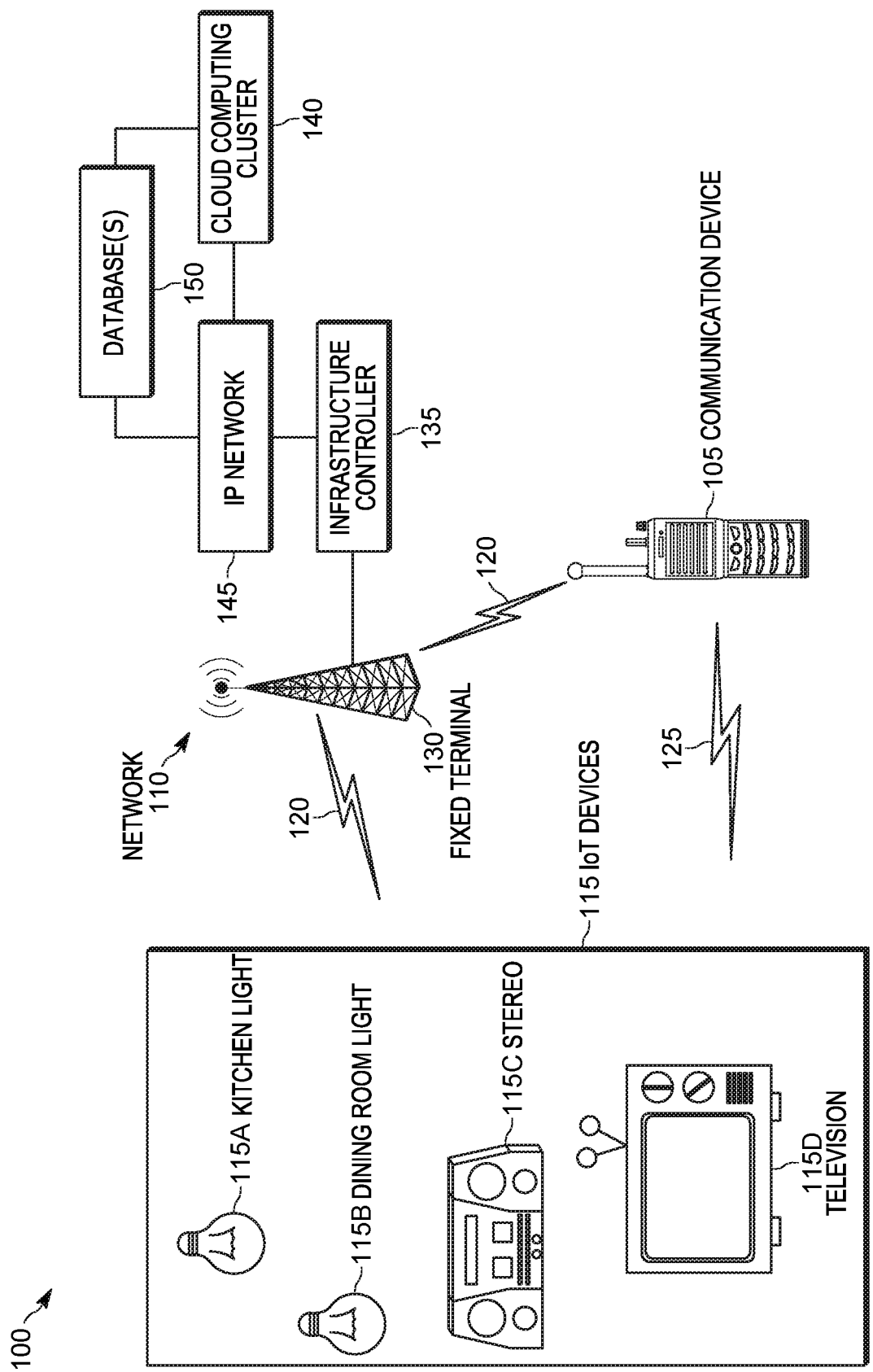
FIG. 1 is a system diagram illustrating a communication system for providing a corrected voice command in response to receiving a voice command that is unrecognizable by a communication device and/or an Internet of things (IoT) device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Due to limited memory space, limited processing power, and/or desired fast response time when performing an action in response to a received voice command, communication devices and/or other Internet of things (IoT) devices may be configured to use exact keyword matching (for example, 100% keyword match) or near-exact keyword matching (for example, 75-100%, exclusive, keyword match) to compare a received voice command to a locally-stored limited list of voice commands that correspond to actions to be taken by the communication device and/or the IoT device in response to the voice command. However, when the user does not know or remember the voice command for a desired action (for example, because the user is a new user or is in an unfamiliar location with unfamiliar IoT devices such as a hotel room) or is unable to pronounce the voice command for a desired action, the communication device and/or the IoT device may be unable to recognize (in other words, unable to sufficiently match) the voice command, and thus, unable to perform the desired action. For example, a lighting system in a home of user may be configured to turn on a kitchen light in response to receiving the voice command "kitchen light on." However, the user may not remember the exact voice command "kitchen light on" and may instead say "turn on the light above the refrigerator." In some situations, the lighting system may not recognize the voice command "turn on the light above the refrigerator" because it does not exactly or near-exactly match any voice commands in the locally-stored limited list of voice commands.

While using a remote server with more processing power and/or memory than the communication device and/or IoT device to perform all voice processing functions may allow for a wider range of voice commands to be stored and/or recognized, communicating with the remote server increases the response time of the communication device and/or IoT device responding to the voice command. Additionally, in some situations, the remote server may not be available due to network connectivity problems between the remote server and the communication device and/or the IoT device. Thus, it is advantageous for a communication device and/or IoT device to use exact or near-exact keyword matching as much as possible and only communicate with a remote server to determine the meaning of a voice command when the voice command is unrecognizable (for example, when a received voice command cannot be keyword-matched). In accordance with the goal of using exact or near-exact keyword matching as much as possible, when the remote server analyzes an unrecognized voice command, it is advantageous for the remote server to determine a corresponding corrected voice command that is recognizable by the communication device using exact or near-exact keyword matching. Such a corrected voice command may be provided to the user for use when the same action is desired in the future.

Disclosed are a method, device, and system for a communication device to provide a corrected voice command to a user. In some embodiments, the communication device determines that an action to be performed in accordance with a first voice command is unrecognizable based on an analysis using a first type of voice recognition (for example, exact or near-exact keyword matching using a local memory and a local processor that compares a received voice command with voice sample data that is stored in the local memory and that is associated with an action to be performed). The communication device transmits the first voice command to a remote electronic computing device for further analysis of the first voice command using a second type of voice recognition (for example, natural language processing) different from the first type of voice recognition. The communication device then receives a second voice command corresponding to the action from the remote electronic computing device. The communication device outputs the second voice command to i) teach the user a corrected voice command corresponding to the action that is recognizable by the communication device (and/or another IoT device) for future use; and/or ii) control an IoT device to perform the action.

The method, device, and system address the above-noted technological problems by improving the interaction between a communication device and/or an IoT device and a user that provides a voice command to the communication device and/or the IoT device. In some situations, by providing the corrected voice command to the user, the user may learn the corrected voice command and use the corrected voice command in the future to request the desired action. Thus, the communication device and/or the IoT device may recognize future received voice commands locally without using a remote electronic computing device. In such situations, the communication device is able to execute the action more quickly than when the remote electronic computing device is used to analyze the voice command. Additionally, in such future situations, the overall system uses less processing power because the remote electronic computing device is not used to analyze the voice command. Furthermore, by teaching the user voice commands that are stored locally, the communication device and/or the IoT device may be designed to use less memory space and processing power than in situations where locally-stored voice commands are not taught to the user. For example, the communication device and/or the IoT device may store one correct voice command for each desired action rather than a number of similar voice commands that correspond to the same desired action. Additionally, the communication device and/or the IoT device may be able to analyze the voice command locally and perform a desired action in situations when there are network connectivity problems and the remote electronic computing device cannot be accessed. In some situations, the communication device and/or the IoT device may use a type of voice recognition (for example, exact or near-exact keyword matching) that uses less processing power to perform than a more complex type of voice recognition used by the remote electronic computing device (for example, natural language processing). Thus, the design of the communication device may allow for fast processing time and less memory to be used when the user knows the correct locally-stored voice commands while still allowing for other voice commands to be analyzed remotely when such voice commands are unrecognizable. The communication device and/or the IoT device also improves out-of-box experience for a new user by providing corrected voice commands to teach the user the voice commands that are stored locally by the communication device and/or the IoT device. For example, it may be inconvenient and burdensome for a new user look up a correct voice command in a manual each time the new user desires to use a voice command.

One embodiment provides a communication device configured to provide a corrected voice command in response to receiving a voice command that is unrecognizable by the communication device. The communication device includes a memory, a microphone, a speaker, and a network interface configured to communicate with a remote electronic computing device. The communication device further includes an electronic processor configured to receive a first voice command via the microphone and analyze the first voice command using a first type of voice recognition. The electronic processor is further configured to determine that an action to be performed in accordance with the first voice command is unrecognizable based on the analysis using the first type of voice recognition. The electronic processor is further configured to transmit, via the network interface, the first voice command to the remote electronic computing device accompanying a request requesting that the first voice command be analyzed using a second type of voice recognition different from the first type of voice recognition. The electronic processor is further configured to receive, via the network interface and from the remote electronic computing device, a second voice command corresponding to the action and different from the first voice command. The electronic processor is further configured to output, with the speaker, the second voice command.

Another embodiment provides a method for providing a corrected voice command in response to receiving a voice command that is unrecognizable by a communication device. The method includes receiving, via a microphone of the communication device, a first voice command via the microphone. The method further includes analyzing, with an electronic processor of the communication device, the first voice command using a first type of voice recognition. The method further includes determining, with the electronic processor, that an action to be performed in accordance with the first voice command is unrecognizable based on the analysis using the first type of voice recognition. The method further includes transmitting, via a network interface of the communication device, the first voice command to a remote electronic computing device accompanying a request requesting that the first voice command be analyzed using a second type of voice recognition different from the first type of voice recognition. The method further includes receiving, via the network interface and from the remote electronic computing device, a second voice command corresponding to the action and different from the first type of voice recognition. The method further includes outputting, with a speaker of the communication device, the second voice command.

Another embodiment provides a communication system configured to provide a corrected voice command in response to receiving a voice command that is unrecognizable by a communication device. The communication system includes a remote electronic computing device including a first electronic processor and a first network interface.

The communication system further includes the communication device including a memory, a microphone, a speaker, a second network interface configured to communicate with the first network interface, and a second electronic processor. The communication device is configured to receive a first voice command via the microphone of the communication device, and analyze, with the second electronic processor of the communication device, the first voice command using a first type of voice recognition. The communication device is further configured to determine, with the second electronic processor of the communication device, that an action to be performed in accordance with the first voice command is unrecognizable based on the analysis using the first type of voice recognition. The communication device is further configured to transmit, from the communication device via the second network interface, the first voice command to the remote electronic computing device. The remote electronic computing device is configured to analyze, with the first electronic processor of the remote electronic computing device, the first voice command using a second type of voice recognition different from the first type of voice recognition. The remote electronic computing device is further configured to determine, with the first electronic processor of the remote electronic computing device, a second voice command corresponding to the action based on the analysis using the second type of voice recognition. The remote electronic computing device is further configured to transmit, from the remote electronic computing device via the first network interface, the second voice command to the communication device. The communication device is further configured to receive, via the second network interface of the communication device, the second voice command, and output, with the speaker of the communication device, the second voice command.

FIG. 1 is a block diagram of a communication system 100 according to one example embodiment. The communication system 100 includes a communication device 105. As illustrated in FIG. 1, the communication device 105 may be a handheld communication device, for example, a mobile telephone or other portable communication device, mobile radio, smart watch, tablet, or other smart wearable, or may be another device configured to communicate over a network 110. In some embodiments, the communication device 105 may be a handheld radio carried by a public safety officer or first responder, such as a police officer. In some embodiments, the communication device 105 may be a mobile communication device mounted in or on a vehicle (for example, a police vehicle, an ambulance, or the like). In some embodiments, the communication device 105 is a laptop computer or a desktop computer.

The communication system 100 also includes Internet of things (IoT) devices 115A, 115B, 115C, and 115D that may be referred to as secondary devices. In the following description, when explaining how a single IoT device functions, a reference to IoT device 115 is used. In some embodiments, the IoT devices 115 (and the communication device 105) are equipped with components that allow the IoT devices 115 to communicate with other devices and receive voice commands from a user. As indicated by FIG. 1, IoT devices 115 may be any one of a number of different types of IoT devices. For example, IoT device 115A is a kitchen light in a home, and IoT device 115B is a dining room light in the home. As other examples, IoT device 115C is a stereo in the home and IoT device 115D is a television in the home.

The types of communication devices 105 and IoT devices 115 described above and shown in FIG. 1 are merely examples. In other embodiments, the communication system 100 includes other types of communication devices 105 and/or IoT devices 115, including but not limited to, enterprise IoT devices in enterprise environments, mission critical IoT devices in mission critical environments, and industrial IoT devices in industrial environments. In some embodiments, the communication system 100 includes more or fewer communication devices 105 and/or IoT devices 115 than the number devices shown in FIG. 1.

As indicated in FIG. 1, the communication device 105 and the IoT devices 115 may communicate with other devices (for example, each other) via the network 110 over respective wireless links 120 and via corresponding network interfaces including one or more transceiver circuits (for example, by sending and receiving radio signals).

Also as shown in FIG. 1, in some embodiments, the communication device 105 and the IoT devices 115 communicate directly with each other via direct-mode wireless link(s) 125 using a communication channel or connection that is outside of the network 110. For example, the communication device 105 and the IoT devices 115 communicate directly with each other when they are within a predetermined distance from each other. In some embodiments, one or more of the IoT devices 115 are configured to communicate solely via direct-mode wireless links 125 with other devices (for example, with communication devices 105 located within a predetermined distance of the IoT device 115). In such embodiments, the one or more IoT devices 115 may not be configured to directly communicate over the network 110. In such embodiments, the one or more IoT devices 115 may only communicate information over the network 110 by communicating through the communication device 105 (for example, a nearby smart phone, portable radio, and the like). For example, the one or more IoT devices 115 form a personal area network (PAN) with the communication device 105 via corresponding short-range PAN transceivers, which may be based on a Bluetooth™, Zigbee, Bluetooth™ Low Energy, WiFi, Near Field Communication (NFC), Radio Frequency ID (RFID) or other short-range wireless protocol.

In some embodiments, the network 110 is a radio access network that provides for radio communication links to be arranged within the network 110 between a plurality of user terminals. Such user terminals may be portable, mobile, or stationary and may include any one or more of the communication device 105 and the IoT devices 115 illustrated in FIG. 1, among other possibilities. At least one other terminal, for example used in conjunction with the communication device 105, may be a fixed terminal 130, for example a base station, eNodeB, repeater, and/or access point. Such a network 110 typically includes a system infrastructure that generally includes a network of various fixed terminals 130, which are in direct radio communication with the communication devices 105. Each of the fixed terminals 130 operating in the network 110 may have one or more transceivers which may, for example, serve communication devices 105 in a given region or area, known as a 'cell' or 'site', by radio frequency (RF) communication. The communication devices 105 that are in direct communication with a particular fixed terminal 130 are said to be served by the fixed terminal 130. In one example, all radio communications to and from each communication device 105 within the network 110 are made via respective serving fixed terminals 130. Sites of neighboring fixed terminals 130 may be offset from one another and may provide corresponding non-overlapping or partially or fully overlapping RF coverage areas.

The network 110 may include wireless and wired portions. The network 110 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, the network 110 may implement a WLAN technology such as Wi-Fi perhaps operating in accordance with an IEEE 802.11 standard (for example, 802.11a, 802.11b, 802.11g) or such as a WiMAX perhaps operating in accordance with an IEEE 802.16 standard. The network 110 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated narrowband RANs. The network 110 may also include future developed networks. In some embodiments, the network 110 may also include a combination of the networks mentioned.

The network 110 is illustrated in FIG. 1 as providing coverage for the communication device 105 and/or the IoT devices 115 via a single fixed terminal 130 coupled to a single infrastructure controller 135 (for example, a radio controller, call controller, PTT server, zone controller, MME, BSC, MSC, site controller, Push-to-Talk controller, or other network device). In other embodiments, additional fixed terminals 130 and additional infrastructure controllers 135 may be disposed to support a larger geographic footprint and/or a larger number of mobile devices.

In some embodiments, the infrastructure controller 135 illustrated in FIG. 1, or some other back-end infrastructure device or combination of back-end infrastructure devices existing on-premises or in a remote cloud computing cluster 140 accessible via an Internet Protocol (IP) network 145 (such as the Internet) operate as a back-end electronic digital assistant, a back-end audio and/or video processing device, and/or a remote cloud-based storage device consistent with the remainder of this disclosure. In some embodiments, such devices, individually or in combination, may be referred to as a remote electronic computing device. In other words, an individual component and/or a combination of individual components of the network 110 may be referred to as a remote electronic computing device. In some embodiments, the remote electronic computing device may be a single electronic processor (for example, an electronic processor of the infrastructure controller 135). In other embodiments, the remote electronic computing device includes multiple electronic processors distributed remotely from each other and linked via a wired and/or wireless communication link(s). For example, the electronic computing device may be implemented on a combination of at least two of an electronic processor of the infrastructure controller 135, an electronic processor of the cloud computing cluster 140 accessible via an IP network 145, and another electronic processor of a back-end device of the network 110. In some embodiments, the remote electronic computing device accesses one or more databases 150 (for example, a voice command database) as described in greater detail below.

The IP network 145 may comprise one or more routers, switches, LANs, WLANs, WANs, access points, or other network infrastructure, including but not limited to, the public Internet. The cloud computing cluster 140 may be comprised of a plurality of computing devices, one or more of which may be executing none, all, or a portion of the functionality of the remote electronic computing device described below, sequentially or in parallel, across the one or more computing devices. The one or more computing devices comprising the cloud computing cluster 140 may be geographically co-located or may be separated by inches, meters, or miles, and inter-connected via electronic and/or optical interconnects. Although not shown in FIG. 1, one or more proxy servers or load balancing servers may control which one or more computing devices perform any part or all of the functionality of the remote electronic computing device described below.

As shown in FIG. 1, database(s) 150 may be accessible by the communication device 105 via the IP network 145 and/or the cloud computing cluster 140, and may include databases such as a voice command database that stores recognized voice commands for various communication devices 105 and/or IoT devices 115 and/or other types of databases. Databases 150 may further include all or a portion of the databases described herein as being provided at the infrastructure controller 135. In some embodiments, the databases 150 may be maintained by third parties. As shown in FIG. 1, the databases 150 are communicatively coupled with the network 110 to allow the communication device 105 and/or the IoT devices 115 to provide data to and retrieve data from the databases 150 via infrastructure controller 135 and the IP network 145. In some embodiments, the databases 150 are commercial cloud-based storage devices. In some embodiments, the databases 150 are housed on suitable on-premises database servers. The databases 150 described above are merely examples. In some embodiments, the system 100 additionally or alternatively includes other databases that store different information. In some embodiments, the databases 150 and/or additional or other databases are integrated with, or internal to, the infrastructure controller 135. In FIG. 1, the schematic couplings between the fixed terminal 130, the infrastructure controller 135, the IP network 145, the cloud computing cluster 140, and the databases 150 represent wired and/or wireless connections between the shown devices.

In some embodiments, the communication device 105 and/or the IoT devices 115 receive a voice command from a user and perform an action in response to receiving the voice command. For example, the communication device 105 plays a song in response to receiving a voice command requesting that the communication device 105 play a song. As another example, the kitchen light 115A turns on in response to receiving a voice command requesting that the kitchen light 115A be turned on. In some embodiments, the communication device 105 and/or the IoT devices 115 perform an action in response to receiving an instruction from another device (for example, an instruction received via a wireless link 120 or direct-mode wireless link 125). For example, in response to receiving an instruction from the remote electronic computing device, the kitchen light 115A may turn on or the communication device 105 may play a song. Similarly, in some embodiments, the communication device 105 receives a voice command and provides an instruction to an IoT device 115 in response to the voice command. For example, the communication device 105 may receive a voice command requesting that the kitchen light 115A be turned on. In response to receiving such a voice command, the communication device 105 communicates an instruction to the kitchen light 115A via a wireless link 120 or 125 to turn on the kitchen light 115A.

Figure 2:
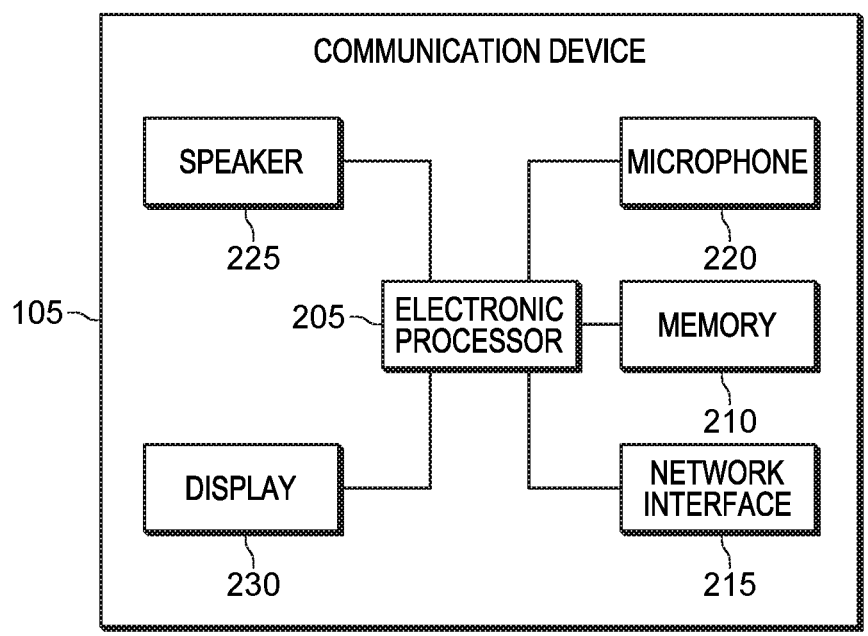
FIG. 2 is a device diagram showing a device structure of the communication device of the communication system of FIG. 1 in accordance with some embodiments.

FIG. 2 is a block diagram of the communication device 105 according to one example embodiment. In the embodiment illustrated, the communication device 105 includes an electronic processor 205 (for example, a microprocessor or other electronic device). The electronic processor 205 includes input and output interfaces (not shown) and is electrically coupled to a memory 210, a network interface 215, a microphone 220, a speaker 225, and a display 230. In some embodiments, the communication device 105 includes fewer or additional components in configurations different from that illustrated in FIG. 2. For example, the communication device 105 may additionally include a push-to-talk button or a camera. As another example, the communication device 105 may include one or more additional input devices such as a computer mouse and/or a keyboard that receive inputs from a user of the communication device 105. As yet another example, the communication device 105 may include a location component (for example, a global positioning system (GPS) receiver) configured to determine the geographic coordinates of the location of the communication device 105. In some embodiments, the communication device 105 performs functionality other than the functionality described below.

The memory 210 may include read only memory (ROM), random access memory (RAM), other non-transitory computer-readable media, or a combination thereof. The electronic processor 205 is configured to receive instructions and data from the memory 210 and execute, among other things, the instructions. In particular, the electronic processor 205 executes instructions stored in the memory 210 to perform the methods described herein.

The network interface 215 sends and receives data to and from other devices of the communication system 100 (for example, the remote electronic computing device and/or the IoT devices 115). In some embodiments, the network interface 215 includes one or more transceivers for wirelessly communicating with the IoT devices 115 and/or the remote electronic computing device. Alternatively or in addition, the network interface 215 may include a connector or port for receiving a wired connection to the IoT devices 115 and/or the network 110, such as an Ethernet cable. In some situations, the electronic processor 205 may receive, via the network interface 215, a list of voice commands supported by the IoT devices 115 from the IoT devices 115. In other situations, the electronic processor 205 may receive, from a voice command database 150 via the network 110, a list of voice commands supported by the IoT devices 115 within a predetermined area. For example, based at least in part on a location of the communication device 105, the communication device 105 may request and/or receive a list of voice commands supported by the IoT devices 115 within a predetermined distance from the location of the communication device 105 (for example, within twenty feet, within Bluetooth™ communication range, within a geofenced area, within a cell/coverage area, or the like). For example, the voice command database 150 stores a location of each of a plurality of IoT devices 115 as well as corresponding voice commands supported by each of the IoT devices 115 of the plurality of IoT devices 115. In some embodiments, the communication device 105 receives, via the network interface 215, new voice command sets with associated functions that may be performed locally by the communication device 105.

The electronic processor 205 may communicate data generated by the communication device 105 over the network 110 through the network interface 215, such as for receipt by one or more other communication devices 105, one or more IoT devices 115, and/or the remote electronic computing device. For example, the electronic processor 205 receives electrical signals representing sound from the microphone 220 (for example, a first voice command) and may communicate information relating to the electrical signals over the network 110 through the network interface 215 to other devices, for example, to one or more other communication devices 105, one or more IoT devices 115, and/or the remote electronic computing device. Similarly, the electronic processor 205 may output information received from the network 110 through the network interface 215 through the speaker 225, the display 230, or a combination thereof (for example, a second, corrected voice command accessed from the voice command database 150 by the remote electronic computing device).

The display 230 displays images, video, text, and/or data from sensor inputs to the user (for example, a public safety officer). The display 230 may be a liquid crystal display (LCD) screen or an organic light emitting display (OLED) display screen. In some embodiments, a touch sensitive input interface may be incorporated into the display 230 as well, allowing the user to interact with content provided on the display 230. In some embodiments, the display 230 includes a projector or future-developed display technologies. In some embodiments, the speaker 225 and the display 230 are referred to as output devices that present information to a user of the communication device 105. In some embodiments, the microphone 220, a computer mouse, and/or a keyboard or a touch-sensitive display are referred to as input devices that receive input from a user of the communication device 105.

In some embodiments, other elements of the communication system 100 of FIG. 1 include similar components as those shown in FIG. 2 with respect to the communication device 105. For example, the infrastructure controller 135, the cloud computing cluster 140, and the IoT devices 115 each include their own electronic processor, memory, and network interface that are similar to the like-named components of the communication device 105 explained above and function in a similar manner as described above with respect to FIG. 2. In some embodiments, these other elements of the communication system 100 include fewer or additional components in configurations different from that illustrated in FIG. 2. For example, the infrastructure controller 135 and the cloud computing cluster 140 may not include one or more of the display 230, the microphone 220, and the speaker 225. As another example, one or more of the IoT devices 115 may not include the speaker 225, the display 230, and/or both. As another example, one or more of the IoT devices 115 may not include the microphone 220 and may instead be configured to receive instructions via a network interface from the communication device 105 and/or the remote electronic computing device as explained above.

As explained above, in some embodiments, at least one of the infrastructure controller 135, the cloud computing cluster 140, and another back-end device of the network 110 form a remote electronic computing device that sends and receives data (for example, voice commands and corresponding information) to/from the communication device 105 and/or the IoT devices 115 via the network 110. In some embodiments, the remote electronic computing device has greater processing power, and/or has access to more stored supported voice commands than the communication device 105 and/or the IoT devices 115, and/or has access to more powerful or resource consuming voice processing algorithms that may, for example, be configured to identify an intent of a voice command instead of using keyword matching techniques.

In some situations, a user may provide a voice command to the communication device 105 and/or to one or more of the IoT devices 115 that is received by the microphone 220 of the communication device 105 and/or the IoT device 115. However, due to limited memory space, limited processing power, and/or desired fast response time when performing an action in response to a received voice command, the communication device 105 and/or the IoT devices 115 may be configured to use exact or near-exact keyword matching to compare a received voice command to a locally-stored limited list of voice commands that correspond to actions to be taken by the communication device 105 and/or the IoT device 115 in response to the voice command. In other words, a first type of voice recognition implemented by the communication device 105 and/or the IoT devices 115 (for example, exact or near-exact keyword matching using a word matching comparison that compares a received voice command with voice sample data that is stored in the local memory and that is associated with an action to be performed) may be less complex and may be able to recognize less voice commands than a second type of voice recognition implemented by the remote electronic computing device (for example, natural language processing and access to larger amounts of language corresponding to stored voice commands).

Figure 3:
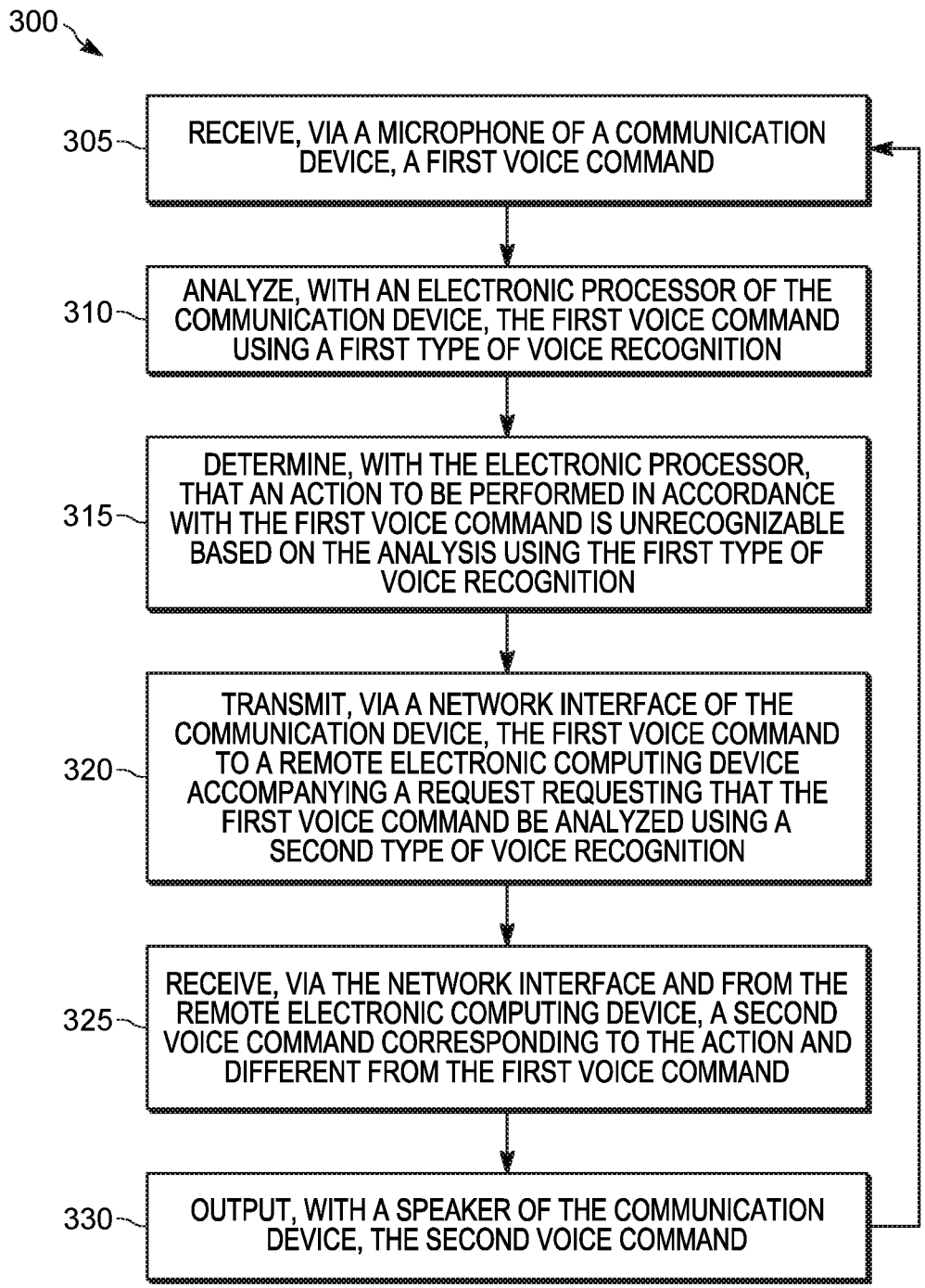
FIG. 3 illustrates a flow chart of a method performed by the communication device of FIG. 2 for providing the corrected voice command in accordance with some embodiments.

To address the technological problems set forth previously herein, the communication device 105 performs, in one instance, a method 300 illustrated in FIG. 3. In executing the method 300, the communication device 105 outputs a corrected voice command to i) teach the user the corrected voice command corresponding to an action that is recognizable by the communication device 105 and/or an IoT device 115 for future use; and/or ii) control the IoT device 115 to perform the action.

The method 300 addresses the above-noted technological problems by improving the interaction between the communication device 105 and/or an IoT device 115 and a user that provides a voice command to the communication device 105 and/or the IoT device 115. In some situations, by providing the corrected voice command to the user, the user may learn the corrected voice command and use the corrected voice command in the future to request the desired action. Thus, the communication device 105 and/or the IoT device 115 may recognize future received voice commands locally without using a remote electronic computing device. In such situations, the communication device 105 and/or the IoT device 115 is able to execute the requested action more quickly than when the remote electronic computing device is used to further analyze the received voice command. Additionally, in such future situations, the overall communication system 100 uses less processing power and/or is able to recognize a future voice command when there is not connectivity to the remote electronic computing device because the remote electronic computing device is not used to analyze the future voice command. Furthermore, by teaching the user voice commands that are stored locally, the communication device 105 and/or the IoT device 115 may be designed to use less memory space and processing power than in situations where locally-stored voice commands are not taught to the user. For example, the communication device 105 and/or the IoT device 115 may store one correct voice command for each desired action rather than a number of similar voice commands that correspond to the same desired action. Similarly, the communication device 105 may use a type of voice recognition (for example, exact or near-exact keyword matching) that uses less processing power to perform than a more complex type of voice recognition used by the remote electronic computing device (for example, natural language processing). Thus, the design of the communication device 105 and/or the IoT device 115 may allow for fast processing time and less memory to be used when the user knows the correct locally-stored voice commands while still allowing for other voice commands to be analyzed remotely when voice commands are unrecognizable. The communication device 105 and/or the IoT device 115 also improves out-of-box experience for a new user by providing corrected voice commands to teach the user the voice commands that are stored locally by the communication device 105 and/or the IoT device 115. For example, it may be inconvenient and burdensome for a new user look up a correct voice command in a user manual each time the new user desires to use a voice command to perform an action.

FIG. 3 illustrates a flow chart diagram of the method 300 performed by the communication device 105 for providing a corrected voice command in response to receiving a voice command that is unrecognizable by the communication device 105 and/or an IoT device 115. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. While the method 300 is explained below as being performed by the communication device 105, in some embodiments, one or more of the IoT devices 115 may be configured to perform the method 300.

At block 305, the electronic processor 205 of the communication device 105 receives a first voice command via the microphone 220. For example, the first voice command is spoken by a user and intended to be received by at least one of the communication device 105 and an IoT device 115 to instruct the at least one of the communication device 105 and the IoT device 115 to execute an action. For example, the first voice command may be intended for the communication device 105 and may instruct the communication device 105 to output a song from the speaker 225. As another example, the first voice command may be intended for the kitchen light 115A and may instruct the kitchen light 115A to turn on. As a variation of the previous example, the first voice command may be intended for the communication device 105 and may instruct the communication device 105 to provide an instruction to the kitchen light 115A to turn on. As another example, the first voice command may be intended for a communication device 105 acting as a two-way communication radio for public safety use. For example, the first voice command instructs the two-way communication radio to change a talkgroup channel, to trigger the radio into a certain public safety mode such as patrolling mode, to alert a dispatcher or command center of an emergency, to prepare a smart vehicle in a certain mode such as pursuit mode, to retrieve video/image footage recorded by a camera in a building during a criminal investigation, and the like. As other examples, the first voice command may be intended for a communication device 105 being used by an employee of a retailer in a retail communication system, by an employee of a warehouse in a warehouse communication system, by an employee of a private security company in a private security communication system, by an employee of a medical facility in a medical facility communication system, or by an employee of heavy machinery entity in a heavy machinery communication system. For example, the first voice command instructs the communication device 105 or an IoT device 115 to flag a retail item as being low in inventory, to retrieve information regarding an item stored in a warehouse, to alert a command center of a breach in security, to request that a medical device to be delivered to a desired location in a hospital, or to enable an ancillary device of heavy machine such as a fan or sprinkler to suppress dust. Other possibilities exist as well.

At block 310, the electronic processor 205 analyzes the first voice command using a first type of voice recognition. In some embodiments, the electronic processor 205 uses speech-to-text techniques to convert the first voice command into text. In some embodiments, the electronic processor 205 compares the text to locally-stored supported voice commands to determine an action that corresponds to the first voice command. In some embodiments, the electronic processor 205 compares the voice data received by the microphone 220 with voice sample data that is stored in the memory 210 (in other words, local memory) and that is associated with actions to be performed to find a match, such as by comparing audio parameter sets sampled over various portions of voice data including but not limited to pitch, time, range, etc., by comparing frequency domain transforms using fast Fourier transforms (FFTs), or by comparing mel-frequency cepstral coefficients (MFCCs), among other possibilities.

As a first example, the first type of voice recognition is a word matching comparison to locally-stored supported voice commands. In other words, in some embodiments, the first type of voice recognition is exact or near-exact keyword matching such that the electronic processor 205 may not be able to recognize converted text or voice data of a voice command unless the voice command exactly or nearly exactly matches or nearly exactly matches a supported voice command that is locally stored in the memory 210 of the communication device 105 or of an IoT device 115. For example, when a stored supported voice command to play song 1 on the communication device 105 is "play song 1," the electronic processor 205 recognizes the exact spoken voice command "play song 1" or near-exact voice commands "please play song 1" or "playing song 1" and executes a corresponding action in response (in other words, outputting song 1 via the speaker 225). However, when the spoken voice command is "start song 1" or "I want to hear song 1," the electronic processor 205 may not be able to keyword-match, and thus recognize, the spoken voice command. As another example, when a stored supported voice command to turn on the kitchen light 115A is "kitchen light on," the kitchen light 115A may execute the corresponding action of turning on in response to receiving the exact voice command "kitchen light on" or the near-exact voice command "kitchen lighting on." However, the kitchen light 115A may not be able to recognize similar voice commands that are not similar enough to be an exact or near-exact match such as "turn on the light in the kitchen" or "turn on the light above the refrigerator."

At block 315, the electronic processor 205 determines that an action to be performed in accordance with the first voice command is unrecognizable based on the analysis using the first type of voice recognition. In embodiments where the first type of voice recognition is a word matching comparison to locally-stored supported voice commands (in other words, exact or near-exact keyword matching), the electronic processor 205 determines that the action to be performed in accordance with the first voice command is unrecognizable by determining that the first voice command (in other words, the converted text or voice data corresponding to the first voice command) does not match with any of the locally-stored supported voice commands (for example, as described in the above examples relating to the song 1 and the kitchen light 115A).

In some embodiments, the electronic processor 205 is configured to determine that an action to be performed in accordance with the first voice command is unrecognizable by an intended recipient IoT device 115 based on the analysis using the first type of voice recognition. In other words, the first voice command may be intended for an IoT device 115 located nearby the communication device 105, but the communication device 105 may determine that the first voice command does not match with any of the supported voice commands locally-stored by the IoT device 115. In some embodiments, the communication device 105 locally stores, in the memory 210, a list of voice commands supported by nearby IoT devices 115 in addition to the voice commands supported by the communication device 105. For example, the electronic processor 205 is configured to receive, via the network interface 215, a list of supported voice commands locally-stored by the IoT device 115 from the IoT device 115 (if not already present/pre-stored on the communication device 105). For example, when the communication device 105 is moved to be within communication range of the IoT device 115, the communication device 105 requests and/or receives the list of supported voice commands locally-stored by the IoT device 115 via a wireless link 125 between the communication device 105 and the IoT device 115. As another example of how the communication device 105 obtains and locally stores the list of supported voice commands locally-stored by the IoT device 115, the electronic processor 205 is configured to receive, via the network interface 215 and from a voice command database 150, lists of supported voice commands locally-stored by IoT devices 115 within a predetermined area. In some embodiments, the lists of supported voice commands for IoT devices 115 are requested and/or received based at least in part on a location of the communication device 105. For example, when the communication device 105 is moved to a new location (for example, a hotel room), the communication device 105 requests and/or receives lists of supported voice commands for nearby IoT devices 115 located within a predetermined distance of the communication device 105 (for example, within ten feet, within fifty feet, within communication range of the of the communication device 105 according to a predetermined communication protocol such as Bluetooth™, within a geofenced area, within a cell/coverage area, and the like). In some situations, the locations of IoT devices 115 are stored in the voice command database 150 which allows for the lists of supported voice commands for the IoT devices 115 located nearby the communication device 105 to be determined.

In some embodiments, the communication device 105 performs a query to a search engine on the Internet over the network 110 using a search term related to an identified location. For example, the query requests voice commands for IoT devices at the Main Street Shopping Mall. When the results of the query are received, the communication device 105 may perform natural language processing on the results. For example, the communication device 105 may perform natural language processing on a website that lists IoT devices 115 in the Main Street Shopping Mall and their associated voice commands. The communication device 105 may then locally store the associated voice commands in the list of supported voice commands on the memory 210. In some embodiments, the query to the search engine and natural language processing of search results is performed by the remote electronic computing device, for example, upon request from the communication device 105.

In some embodiments, when the communication device 105 is moved outside of the predetermined distance from an IoT device 115, the communication device 105 deletes the list of supported voice commands for the IoT device 115 from the memory 210. In some embodiments, such deletion prevents the memory 210 from becoming full and clears space in the memory 210 for lists of supported voice commands for other IoT devices 115 that are nearby the communication device 105 as the communication device 105 is moved to different locations. In other words, the communication device 105 may dynamically update a location-based list of voice commands supported by nearby IoT devices 115 by communicating with at least one of the IoT devices 115 and the voice command database 150 as described above. The temporary storage method explained above allows the communication device 105 to determine which voice commands are supported by nearby IoT devices 115 without the communication device 105 having to permanently store lists of supported voice commands for all possible IoT devices 115 that the communication device 105 may encounter. In other words, the communication device 105 may be equipped with less memory than that required to store all voice commands supported by all possible IoT devices 115 that the communication device 105 may encounter.

In some embodiments, the communications device 105 continues to store the voice commands supported by an IoT device 115 in the memory 210 even after the communication device 105 has moved outside of the predetermined distance from the IoT device 115. However, the communication device 105 may flag such voice commands as inactive when the communication device 105 is outside of the predetermined from the IoT device 115. Such flagging may reduce processing power when the communication device 105 analyzes received voice commands because the electronic processor 205 compares the received voice command to less possible stored voice commands. In such embodiments, the communication device 105 may retrieve and reactivate inactive, stored voice commands when the communication device 105 moves back to a location that is within the predetermined distance from the IoT device 115. Such storage of inactive voice commands may be useful when there are network connectivity problems and the communication device 105 is unable to communicate over the network 110 (for example, to retrieve supported voice commands of nearby IoT devices 115).

At block 320, the electronic processor 205 transmits, via the network interface 215, the first voice command to the remote electronic computing device accompanying a request requesting that the first voice command be analyzed using a second type of voice recognition different from the first type of voice recognition. In some embodiments, the electronic processor 205 transmits the first voice command and the request to the remote electronic computing device in response to determining (at block 315) that the action to be performed in accordance with the first voice command is unrecognizable based on the analysis using the first type of voice recognition. The electronic processor 205 transmits the first voice command and request to the remote electronic computing device via the network 110 using any one of a number of communication methods. For example, the electronic processor 205 transmits the first voice command to the remote electronic computing using a push-to-talk call such that the remote electronic computing device receives sound data corresponding to the first voice command. As another example, the electronic processor 205 transmits the first voice command to the remote electronic computing using a transmission of a data file. For example, the data file includes audio data or converted text data corresponding to the first voice command. In other words, the transmitting of the first voice command to the remote electronic computing device may include transmitting the first voice command itself (via a push-to-talk call) or transmitting data corresponding to the first voice command (transmission of a data file including but not limited to a digital audio file and a text file).

In some embodiments, the request to use a second type of voice recognition to analyze the first command that the electronic processor 205 transmits along with the first voice command is indicated by a type of data transmission (for example, by transmitting a push-to-talk call or a digital audio file) or by an opcode or metadata included in the data transmission. In some embodiments, the request identifies the first type of voice recognition used by the communication device 105 to attempt to recognize the first voice command. In some embodiments, the request includes a particular type of voice recognition to be used by the remote electronic computing device as the second type of voice recognition. In some embodiments, the request to use a second type of voice recognition to analyze the first command is implied by the mere transmission of the first voice command. In other words, the remote electronic computing device may be configured to analyze the received first voice command using a second type of voice recognition (as explained below with respect to FIG. 4) in response to receiving the first voice command.

Figure 4:
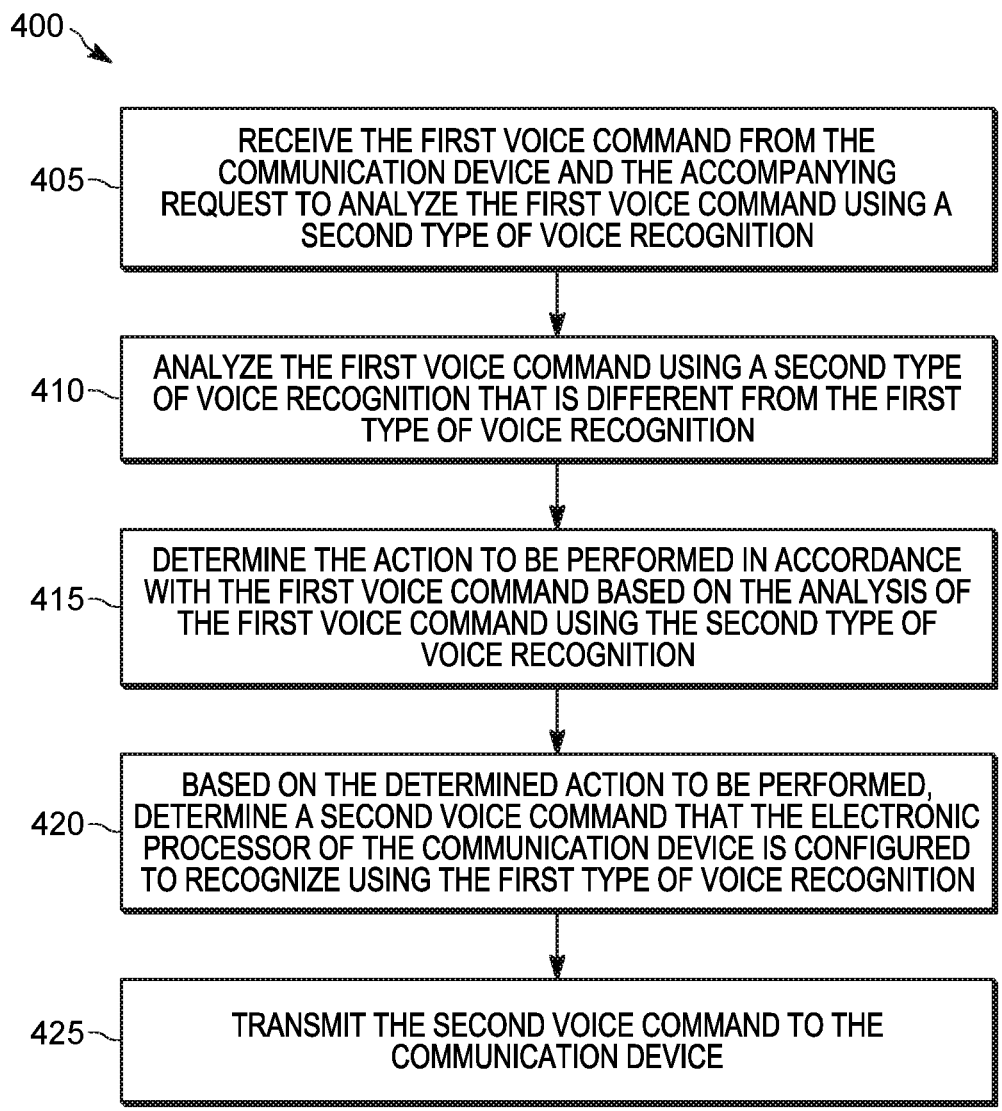
FIG. 4 illustrates a flow chart of a method performed by a remote electronic computing device of the communication system of FIG. 1 for determining the corrected voice command in accordance with some embodiments.

FIG. 4 illustrates a flow chart diagram of a method 400 performed by the remote electronic computing device for determining a corrected second voice command in response to receiving the first voice command from the communication device 105 that is unrecognizable by the communication device 105 and/or an IoT device 115. While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure.

At block 405, the remote electronic computing device receives the first voice command from the communication device 105 and the accompanying request to analyze the first voice command using a second type of voice recognition. At block 410, the remote electronic computing device analyzes the first voice command using a second type of voice recognition that is different from the first type of voice recognition. In embodiments where the remote electronic computing device receives sound data corresponding to the first voice command, the remote electronic computing device may use speech-to-text techniques to convert the first voice message into text as described above with respect to block 310. As mentioned above, in some embodiments, the second type of voice recognition is more complex and able to recognize more voice commands than the first type of voice recognition implemented locally by the communication device 105. For example, the second type of voice recognition uses a natural language processing engine (for example, Rasa natural language processing, Natural Language Toolkit (NLTK), Stanford CoreNLP, and the like) configured to determine an intent and/or content of the first voice command rather than merely performing exact or near-exact keyword matching. As another example, the remote electronic computing device may have more processing power than the communication device 105 and may have access to larger amounts of language, a larger number of different languages, or an enhanced ability to re-arrange words and/or terms into all possible different orderings and determine whether a keyword match or NLP match could then be found corresponding to stored voice commands. As one, the remote electronic computing device may be able to compare the first voice command to hundreds of stored word strings that are similar to one or a few supported voice commands locally stored by the communication device 105 that correspond to the action to be performed.

At block 415, based on the analysis of the first voice command using the second type of voice recognition, the remote electronic computing device determines the action to be performed in accordance with the first voice command. Continuing the above example relating to the kitchen light 115A, the remote electronic computing device determines that the intended action to be performed is turning on the kitchen light 115A when the voice command is "turn on the light in the kitchen." For example, the natural language processing engine of the remote electronic computing device recognizes the words "turn on," "light," and "kitchen" and their relationship and determines that the intended action to be performed is turning on the kitchen light 115A. As a variation of the above example, the voice command "turn on the light in the kitchen" may be one of many stored synonyms of the voice command supported by the communication device 105 that are remotely stored and analyzed by the remote electronic computing device. As another example, when the voice command is "turn on the light above the refrigerator," the natural language processing engine of the remote electronic computing device recognizes the words "turn on" and "refrigerator" and their relationship. The electronic computing device may further leverage an artificial intelligence or trained neural network model that may determine that the word "refrigerator" is often associated with a kitchen or that the refrigerator is location in the kitchen of a building based on location data or a map of the building retrieved from a database 150. Accordingly, the remote electronic computing device determines, using the association and remaining terms in the voice command, that the intended action to be performed is turning on the kitchen light 115A.

In some embodiments, the remote electronic computing device determines a second voice command corresponding to the action based on the analysis of the first voice command using the second type of voice recognition. For example, at block 420, based on the determined action to be performed, the remote electronic computing device determines a second voice command that the electronic processor 205 of the communication device 105 is configured to recognize using the first type of voice recognition. Continuing the above example relating to the kitchen light 115A, in response to determining that the action to be performed is turning on the kitchen light 115A, the remote electronic computing device determines that the second voice command is "kitchen light on." In other words, when the first type of voice recognition includes a word matching comparison to supported voice commands locally-stored by the communication device 105 (in other words, exact or near-exact keyword matching), the remote electronic computing device determines a second voice command that is one of the supported voice commands locally-stored by the communication device 105. In embodiments where the first voice command is intended for an IoT device 115 located nearby the communication device 105, the remote electronic computing device determines a second voice command that is one of the supported voice commands locally-stored by the intended recipient IoT device 115.

To determine a second voice command that the communication device 105 and/or an intended recipient IoT device 115 is configured to recognize using the first type of voice recognition, in some embodiments, the remote electronic computing device accesses the voice command database 150. In some embodiments, the voice command database 150 stores supported voice commands that are stored locally for each of a plurality of communication devices 105 and/or IoT devices 115. In some embodiments, when the communication device 105 transmits the first voice command to the remote electronic computing device (at block 320), the communication device 105 also transmits identification information of the communication device 105 or one or more IoT devices 115 located nearby (for example, including an intended recipient IoT device 115). Using the identification information, the remote electronic computing device looks up supported voice commands in the voice command database 150.

In other embodiments, the remote electronic computing device may not have access to the voice commands supported by the communication device 105 and/or the nearby IoT devices 115. In such embodiments, the electronic processor 205 of the communication device 105 is configured to transmit, via the network interface 215, a list of voice commands supported by the communication device 105 and/or the IoT devices 115 located within a predetermined distance from the communication device 105. For example, the communication device 105 transmits such information along with the first voice command to allow the remote electronic computing device to determine an action to be performed in accordance with the first voice command and determine a second voice command that corresponds to the action and that is supported by the communication device 105 and/or the nearby IoT devices 115. In some situations, when IoT devices 115 are configured to communicate over the network 110, the IoT devices (for example, located within a predetermined distance of the communication device 105) may each transmit a list of voice commands supported by the respective IoT device 115. As explained above with respect to the Main Street Shopping Mall example, the communication device 105 and/or the remote electronic computing device may perform a search query to a search engine on the Internet over the network 110 to search for IoT devices 115 located nearby by the communication device 105 and their associated supported voice commands. In some embodiments, a search term of search query is based on location data of the communication device 105 and/or identification information of nearby IoT devices 115.

In some embodiments, when the communication device 105 is unable to establish a wireless link 125 with an IoT device 115 and the IoT device 115 is not configured to communicate over the network 110, the remote computing device uses information associated with the IoT device 115 that was stored during previous communication with other communication devices 105. For example, other communication devices 105 may have communicated first voice commands intended for the IoT device 115 via the same fixed terminal 130 to the remote electronic computing device. In response to these first voice commands, the remote electronic computing device may have transmitted second voice commands back to the communication devices 105 as described below. The remote electronic computing device may access historical records of such communication via the same fixed terminal 130 that include previously-identified second voice commands associated with the IoT device 115. The remote electronic computing device may use these historical records to determine at least a portion of a list of voice commands supported by the IoT device 115.

In the above embodiments describing the use of a list of voice commands supported by the communication device 105 and/or the IoT devices 115, using a consolidated list of voice commands supported by the communication device 105 and/or the nearby IoT devices 115 within a predetermined area based on the location of the communication device 105 may reduce processing time by the remote electronic computing device because the consolidated list of supported voice commands limits the possible actions corresponding to the first voice command. In other words, the remote electronic computing device may be able to analyze less possible actions (for example, only the actions included in the consolidated list) when determining the action to be performed in accordance with the first voice command (at block 415), which may reduce processing time and power.

After the remote electronic computing device determines the second voice command corresponding to the action to be performed in accordance with the first voice command (at block 420), at block 425, the remote electronic computing device is transmits the second voice command to the communication device 105 via the network 110. In some embodiments, the remote electronic computing device repeats the method 400 for each first voice command that is received by the remote electronic computing device from a communication device 105.

Returning back to FIG. 3, at block 325, the electronic processor 205 of the communication device 105 receives, via the network interface 215 and from the remote electronic computing device, the second voice command that is different from the first voice command and corresponds to the action to be performed in accordance with the first voice command. In some embodiments, the communication device 105 receives the second voice command by receiving one of a push-to-talk call, a data file (such as a voice, audio, or text file), and the like in a similar manner as described above with respect to transmission of the first voice command (at block 320). As described above, the second voice command received by the communication device 105 is determined by the remote electronic computing device by analyzing the first voice command using the second type of voice recognition that is different from the first type of voice recognition implemented by the communication device 105.

At block 330, the electronic processor 205 of the communication device 105 outputs, with the speaker 225, the second voice command. In some embodiments, outputting the second voice command is intended to teach the user a corrected voice command for future use that corresponds to the action and that is recognizable by the communication device 105 and/or a nearby IoT device 115. In other words, the second voice command is a corrected voice command that is recognizable using the first type of voice recognition implemented locally by the communication device 105 and/or the nearby IoT devices 115 as explained above. Accordingly, one purpose of the method 300 is to teach the user (for example, a new user) corrected supported voice commands that are stored locally by the communication device 105 and/or the IoT devices 115 (in other words, out-of-box experience training for a new user). In some embodiments, the communication device 105 also outputs, via the speaker 225, an indication to the user that the first voice command is not supported locally by the communication device 105. In some embodiments, the communication device 105 also outputs, via the speaker 225, a recommendation to the user that the second voice command be used in the future when the user desires to request the intended action. In some embodiments when outputting indications of correct/locally supported voice commands and incorrect/locally unsupported voice commands, the communication device 105 also outputs, via the speaker 225, the respective voice commands to attempt to teach the user corrected supported voice commands.

In some embodiments, the electronic processor 205 of the communication device 105 is configured to execute the action to be performed in accordance with the first voice command and the second voice command. In some embodiments, the communication device 105 receives instructions from the remote electronic computing device to execute the task along with receiving the second voice command. In other embodiments, the electronic processor 205 executes the task in response to receiving the second voice command from the remote electronic computing device. For example, the communication device 105 transmits a first voice command of "I want to hear song 1" to the remote electronic computing device and receives a second voice command of "play song 1" from the remote electronic computing device. In response to receiving the second voice command of "play song 1," the communication device 105 outputs the second voice command of "play song 1" with the speaker 225 as if the communication device 105 is giving the instruction to itself to play song 1. Then the communication device 105 plays song 1 with the speaker 225. Such outputting of the second voice command on the speaker 225 before or commensurate with executing the action of playing song 1 on the speaker 225 allows the user to learn a corrected voice command (in other words, the second voice command of "play song 1") to use in the future when the user desires the same action to be performed.

In embodiments where the first voice command is intended for an IoT device 115 located nearby the communication device 105, the outputting of the second voice command with the speaker 225 may cause the intended recipient IoT device 115 to execute the action to be performed in accordance with the first voice command and the second voice command. For example, the intended recipient IoT device 115 is configured to receive the audio of the second voice command output by the speaker 225 of the communication device 105 via a second microphone of the intended recipient IoT device 115. In response to receiving the audio of the second voice command via the second microphone, the intended recipient IoT device 115 executes the action. As described above, in such embodiments, the second voice command is a supported voice command that is locally-stored on a memory of the intended recipient IoT device 115. For example, the communication device 105 receives the second voice command of "kitchen light on" from the remote electronic computing device. The communication device 105 outputs audio corresponding to the second voice command of "kitchen light on" with the speaker 225. The kitchen light 115 receives the second voice command from the speaker 225 of the communication device 105 with a microphone of the kitchen light 115A and determines that the received audio of the second voice command is an exact or near-exact keyword match with a locally stored voice command of the kitchen light 115A. The kitchen light 115A determines that the action associated with the stored supported voice command is turning on the kitchen light 115A. Accordingly, the kitchen light 115A turns on in response to receive the audio of the second voice command. In this situation, the outputting of the second voice command by the communication device 105 provides a voice command to an IoT device (the kitchen light 115A) as well as teaching the user a corrected voice command (in other words, the second voice command of "kitchen light on") to use in the future when the user desires the same action to be performed.

In other embodiments, the remote electronic computing device may additionally or alternatively transmit an instruction, over the network 110, to the intended recipient IoT device 115 to cause the intended recipient IoT device 115 to execute the action. For example, when the intended recipient IoT device 115 is configured to communicate with the remote electronic computing device over the network 110, the transmitted instruction ensures that the action is executed even though the intended recipient IoT device 115 may not receive the second voice command from the speaker 225 of the communication device 105 (for example, due to a loud/noisy environment of the communication device 105, due to the second microphone of the intended recipient IoT device 115 being blocked, or the like). Similarly, in some embodiments, the communication device 105 may additionally or alternatively transmit an instruction, over one of the wireless links 120 or 125, to the intended recipient IoT device 115 to cause the intended recipient IoT device 115 to execute the action.

Continuing the above example relating to the kitchen light 115A, the communication device 105 transmits a first voice command of "turn on the light above the refrigerator" to the remote electronic computing device and receives a second voice command of "kitchen light on" from the remote electronic computing device. In response to receiving the second voice command of "kitchen light on," the communication device 105 outputs the second voice command with the speaker 225 to teach the user the correct voice command for turning the kitchen light 115A on. The kitchen light 115A then turns on in response to at least one of receiving the second voice command from the speaker 225 and receiving a corresponding instruction from the communication device 105 and/or the remote electronic computing device as explained above.

As indicated by FIG. 3, the communication device 105 may repeat the method 300 for additional voice commands that are received and not recognized by the first type of voice recognition. In some embodiments, when the electronic processor 205 recognizes a voice command using the first type of voice recognition, the method stops at block 310 and executes the action to be performed in accordance with the voice command. In other words, in some embodiments, the communication device 105 only transmits a received voice command to the remote electronic computing device for further analysis in response to determining that the received voice command is not recognizable based on an analysis of the received voice command using the first type of voice recognition.

As indicated by the above explanation, the method 300 allows the communication device 105 and/or an IoT device 115 to quickly analyze and execute an action in accordance with voice commands that correspond to supported voice commands stored locally by the communication device 105 and/or the IoT device 115 (for example, because the communication device 105 and/or the IoT device 115 does not transmit such voice commands to the remote electronic computing device for analysis). However, the method 300 also allows the communication device 105 and/or the IoT device 115 to recognize voice commands that are locally unsupported by the communication device 105 and/or the IoT device 115 by transmitting such voice commands to the remote electronic computing device for further analysis. Additionally, the method 300 aims to teach the user a locally-supported voice command that corresponds to an unsupported voice command received by the communication device 105 and/or the IoT device 115 in order to increase the amount of future voice commands that may be analyzed locally by the communication device 105 and/or the IoT device 115.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A communication device configured to provide a corrected voice command in response to receiving a voice command that is unrecognizable by the communication device, the communication device comprising:
   a memory;
   a microphone;
   a speaker;
   a network interface configured to communicate with a remote electronic computing device; and
   an electronic processor configured to
      receive a first voice command via the microphone,
      analyze the first voice command using a first type of voice recognition, wherein the first type of voice recognition includes a word matching comparison to locally-stored supported voice commands,
      determine that an action to be performed in accordance with the first voice command is unrecognizable based on the analysis using the first type of voice recognition,
      transmit, via the network interface, the first voice command to the remote electronic computing device accompanying a request requesting that the first voice command be analyzed using a second type of voice recognition different from the first type of voice recognition,
      receive, via the network interface and from the remote electronic computing device, a second voice command corresponding to the action and different from the first voice command, wherein the second voice command is one of the locally-stored supported voice commands, and
      output, with the speaker, the second voice command and a recommendation that the second voice command be used in the future to request the action.

2. The communication device of claim 1, wherein the electronic processor is further configured to execute the action based on receiving the second voice command from the remote electronic computing device.

3. The communication device of claim 1, wherein the electronic processor is configured to output, with the speaker, the second voice command to cause a secondary device to execute the action;
   wherein the secondary device is configured to receive the second voice command via a second microphone and execute the action in response to receiving the second voice command via the second microphone;
   wherein the second voice command is a supported voice command that is locally-stored on a second memory of the secondary device.

4. The communication device of claim 1, wherein the electronic processor is further configured to transmit, via the network interface and to the remote electronic computing device, a list of voice commands supported by at least one of the group consisting of the communication device and secondary devices within a predetermined area.

5. The communication device of claim 4, wherein the electronic processor is configured to receive, via the network interface, at least a portion of the voice commands included in the list of voice commands from one or more secondary devices.

6. The communication device of claim 1, wherein the electronic processor is configured to receive, via the network interface and from a voice command database, a list of voice commands supported by secondary devices within a predetermined area, wherein the list of voice commands is based at least in part on a location of the communication device.

7. The communication device of claim 1, wherein the second type of voice recognition comprises natural language processing.

8. The communication device of claim 1,
   wherein the electronic processor is configured to determine that the action to be performed in accordance with the first voice command is unrecognizable by determining that the first voice command does not match with any of the locally-stored supported voice commands.

9. The communication device of claim 1, wherein the second voice command is recognizable by the electronic processor using the first type of voice recognition.

10. The communication device of claim 1, wherein the electronic processor is configured to transmit the first voice command to the remote electronic computing device using at least one of the group consisting of a first push-to-talk call and a first transmission of a first data file;
   wherein the electronic processor is configured to receive the second voice command from the remote electronic computing device by receiving at least one of the group consisting of a second push-to-talk call and a second data file.

11. A method for providing a corrected voice command in response to receiving a voice command that is unrecognizable by a communication device, the method comprising:
   receiving, via a microphone of the communication device, a first voice command via the microphone, analyzing, with an electronic processor of the communication device, the first voice command using a first type of voice recognition, the first type of voice recognition including a word matching comparison to locally-stored supported voice commands, determining, with the electronic processor, that an action to be performed in accordance with the first voice command is unrecognizable based on the analysis using the first type of voice recognition, transmitting, via a network interface of the communication device, the first voice command to a remote electronic computing device accompanying a request requesting that the first voice command be analyzed using a second type of voice recognition different from the first type of voice recognition, receiving, via the network interface and from the remote electronic computing device, a second voice command corresponding to the action and different from the first voice command, the second voice command being one of the locally-stored supported voice commands, and outputting, with a speaker of the communication device, the second voice command and a recommendation that the second voice command be used in the future to request the action.

12. The method of claim 11 further comprising executing the action with the electronic processor based on receiving the second voice command from the remote electronic computing device.

13. The method of claim 11, wherein outputting the second voice command with the speaker causes a secondary device to execute the action;
wherein the secondary device is configured to receive the second voice command via a second microphone and execute the action in response to receiving the second voice command via the second microphone;
wherein the second voice command is a supported voice command that is locally-stored on a memory of the secondary device.

14. The method of claim 11 further comprising:
receiving, via the network interface, a list of supported voice commands from one or more secondary devices; and
transmitting, via the network interface and to the remote electronic computing device, the list of supported voice commands.

15. The method of claim 11 further comprising receiving, via the network interface and from a voice command database, a list of voice commands supported by secondary devices within a predetermined area, wherein the list of voice commands is based at least in part on a location of the communication device.

16. The method of claim 11, wherein the second type of voice recognition comprises natural language processing; and
wherein determining that the action to be performed in accordance with the first voice command is unrecognizable includes determining that the first voice command does not match with any of the locally-stored supported voice commands.

17. The method of claim 11, wherein the second voice command is recognizable by the electronic processor using the first type of voice recognition.

18. A communication system configured to provide a corrected voice command in response to receiving a voice command that is unrecognizable by a communication device, the communication system comprising:
a remote electronic computing device including a first electronic processor and a first network interface; and
the communication device including
a memory,
a microphone,
a speaker,
a second network interface configured to communicate with the first network interface, and
a second electronic processor;
wherein the communication device and the remote electronic computing device are configured to
receive a first voice command via the microphone of the communication device,
analyze, with the second electronic processor of the communication device, the first voice command using a first type of voice recognition, wherein the first type of voice recognition includes a word matching comparison to locally-stored supported voice commands,
determine, with the second electronic processor of the communication device, that an action to be performed in accordance with the first voice command is unrecognizable based on the analysis using the first type of voice recognition,
transmit, from the communication device via the second network interface, the first voice command to the remote electronic computing device,
analyze, with the first electronic processor of the remote electronic computing device, the first voice command using a second type of voice recognition different from the first type of voice recognition,
determine, with the first electronic processor of the remote electronic computing device, a second voice command corresponding to the action based on the analysis using the second type of voice recognition, wherein the second voice command is one of the locally-stored supported voice commands,
transmit, from the remote electronic computing device via the first network interface, the second voice command to the communication device,
receive, via the second network interface of the communication device, the second voice command, and
output, with the speaker of the communication device, the second voice command and a recommendation that the second voice command be used in the future to request the action.

19. The communication system of claim 18, wherein the second voice command is recognizable by the second electronic processor of the communication device using the first type of voice recognition.

* * * * *